(12) United States Patent
Holland et al.

(10) Patent No.: US 8,755,610 B2
(45) Date of Patent: Jun. 17, 2014

(54) AUTO-RECOGNITION FOR NOTEWORTHY OBJECTS

(75) Inventors: Jerremy Holland, Los Altos Hills, CA (US); Jan Erik Solem, San Francisco, CA (US); William E. Hensler, Shoreline, WA (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 13/158,210

(22) Filed: Jun. 10, 2011

(65) Prior Publication Data

US 2012/0314962 A1 Dec. 13, 2012

(51) Int. Cl.
*G06K 9/68* (2006.01)

(52) U.S. Cl.
USPC .......................................... 382/218; 382/118

(58) Field of Classification Search
USPC .................................. 382/118, 218; 707/737
See application file for complete search history.

(56) References Cited

U.S. PATENT DOCUMENTS

| | | | |
|---|---|---|---|
| 7,587,068 B1 * | 9/2009 | Steinberg et al. | 382/118 |
| 8,199,979 B2 * | 6/2012 | Steinberg et al. | 382/118 |
| 8,229,928 B2 * | 7/2012 | Yun | 707/737 |
| 2004/0015514 A1 * | 1/2004 | Melton et al. | 707/103 R |
| 2005/0043897 A1 | 2/2005 | Meyer | |
| 2006/0253491 A1 | 11/2006 | Gokturk et al. | |
| 2009/0280859 A1 | 11/2009 | Bergh | |
| 2010/0058304 A1 * | 3/2010 | Mosier et al. | 717/159 |
| 2010/0150407 A1 | 6/2010 | Cheswick | |
| 2010/0223299 A1 * | 9/2010 | Yun | 707/803 |
| 2012/0206438 A1 * | 8/2012 | Porikli et al. | 345/419 |
| 2012/0314962 A1 * | 12/2012 | Holland et al. | 382/218 |

FOREIGN PATENT DOCUMENTS

| | | |
|---|---|---|
| WO | WO-2011/017653 A1 | 2/2011 |
| WO | WO-2012/170434 A1 | 12/2012 |

OTHER PUBLICATIONS

"International Application Serial No. PCT/US2012/040937, Search Report mailed Nov. 19, 2012", 4 pgs.
"International Application Serial No. PCT/US2012/040937, Written Opinion mailed Nov. 19, 2012", 6 pgs.

* cited by examiner

*Primary Examiner* — Gregory M Desire
(74) *Attorney, Agent, or Firm* — Schwegman Lundberg & Woessner, P.A.

(57) ABSTRACT

Techniques for automatically identifying famous people and/or iconic images are provided. Object descriptors (or "faceprints") of the famous people and iconic images are generated and "shipped" with a digital image management application used by an end-user. The digital image management application analyzes a digital image (generated, for example, by a digital camera operated by the end-user) to detect an object, such as a face, and generates a faceprint. The digital image management application compares the faceprint to the faceprints of the famous people and/or iconic images. If a match is found, then data that identifies the corresponding person or object is displayed to the end-user.

23 Claims, 4 Drawing Sheets

| IDENTIFICATION DATA 210 | FACEPRINT 220 | METADATA 230 |
|---|---|---|
| RINGO STARR | | |
| RINGO STARR | | |
| GEORGE HARRISON | | |
| ⋮ | ⋮ | ⋮ |
| MONA LISA | | |
| SANTA CLAUS | | |
| SANTA CLAUS | | |

REMOTELY-GENERATED FACEPRINT DATABASE 130

*FIG. 2*

AUTO-RECOGNITION FOR NOTEWORTHY OBJECTS

FIELD OF THE INVENTION

The present invention relates to determining whether famous people or objects appear in digital images that are taken or identified by a user.

BACKGROUND

With the advent of inexpensive digital cameras, end-users around the world take many pictures without having to worry about having the pictures "developed," as was the case with traditional camera film. Digital image management software has been developed to allow users to organize the hundreds and thousands of digital images they take. Digital image management applications allow users to manage and manipulate digital images that the user chooses to import into the image editing application. For example, a user can import digital photographs from a camera, card reader, or storage medium into the image editing application. Then, the user can edit the photograph in some manner. Some examples of editing are removing red-eye, adjusting color, brightness, contrast, filtering noise etc. Other examples of editing are cropping or rotating a photograph. A user can also edit a photograph by adding annotations, such as rating the photograph or other comments One feature of some versions of digital image management software is the ability to analyze digital images and determine whether a person that appears in one digital image also appears in another digital image. This analysis may be performed in response to a user manually locating a person in a digital image or that person being automatically detected by the software. The digital image management software then automatically searches through other digital images (managed by the digital image management software) to identify digital images of the same person. In this way, a group of digital images may be associated based on a particular person that is identified in each. For example, all photos with "Grandma Jane" may be automatically identified without the user having to manually identify Grandma Jane in each digital image.

The automatic detection of a person's face in a digital image is referred to as facial detection. The automatic recognition of a person's face in a digital image is referred to as facial recognition. In order to automatically recognize a person's face that is detected in a digital image, facial detection/recognition software generates a set of features or a feature vector (referred to as a "faceprint") that indicate characteristics of the person's face. (A "faceprint" is a subset of feature vectors that may be used for object recognition. Thus, feature vectors for non-facial objects can be generated and used for object recognition.) The generated faceprint is then compared to other faceprints to determine whether the generated faceprint matches (or is similar enough to) one or more of the other faceprints. If so, then the facial detection/recognition software determines that the person corresponding to the generated faceprint is likely to be the same person that corresponds to the "matched" faceprint(s).

Once the digital images with Grandma Jane in them are identified, the digital image management software may store data that associates all digital images, taken by the user, that have Grandma Jane identified in them. However, such associations are only made of people identified in pictures managed by the digital image management program.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a block diagram that depicts a logical structure of a remotely-generated faceprint database, according to an embodiment of the invention.

SUMMARY

Figure 1:
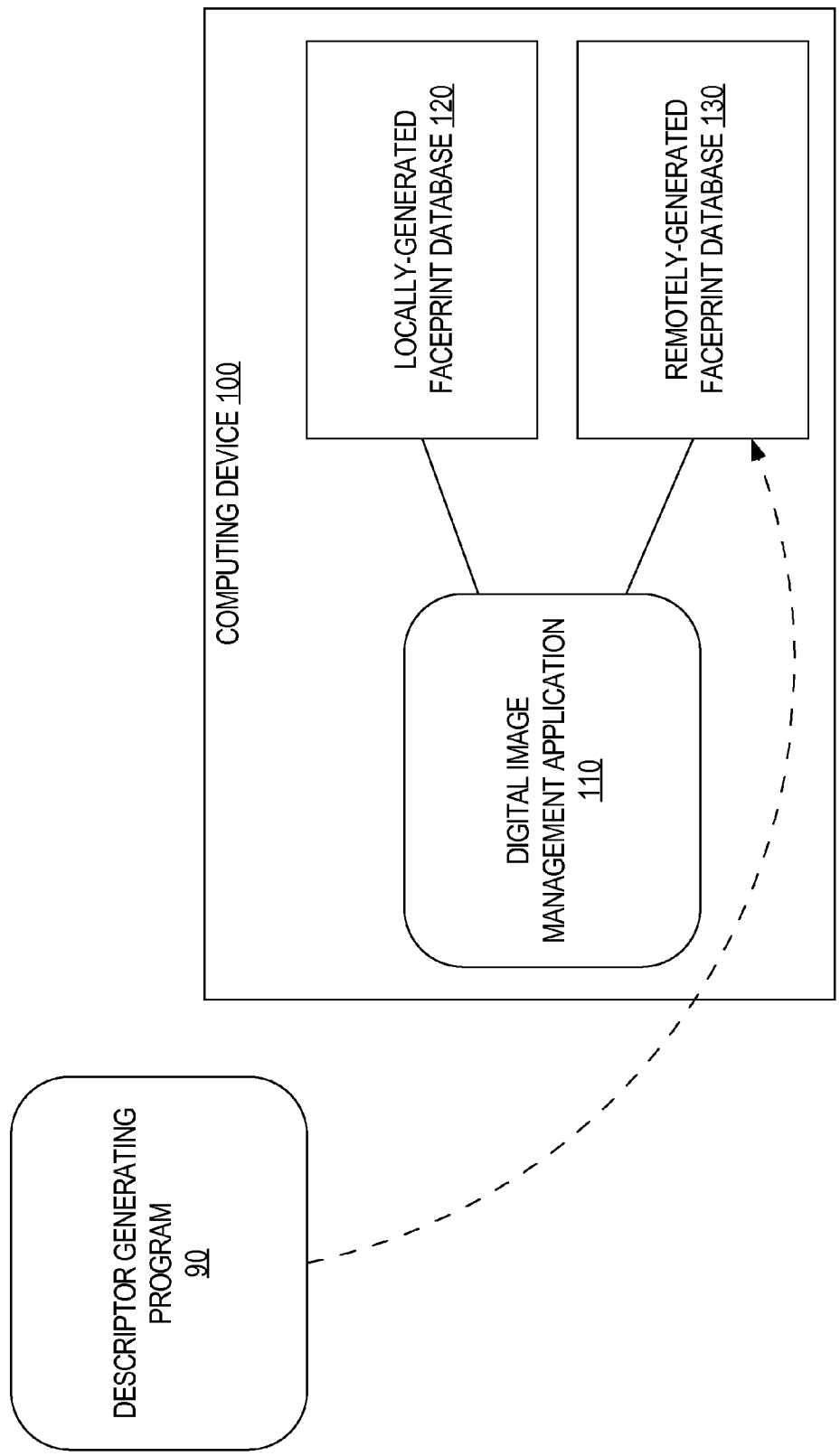
FIG. 1 is a block diagram that depicts an example digital image management system, according to an embodiment of the invention.

"Faceprints" of famous people and/or noteworthy objects are provided to a digital image management application without the digital image management application having to generate the faceprints or manage the digital images from which the faceprints were generated. The "famous" or "noteworthy" faceprints are maintained separately from faceprints generated by the digital image management application, which are generally of friends, family, and other associates of the user of the management application.

According to one technique, when the digital image management application analyzes a digital image, detects a face, and generates a faceprint, that faceprint is first compared to the "friends" faceprints. If no match is found, then the generated faceprint is compared to "famous" faceprints. The threshold for determining a match between faceprints may be different depending on whether the comparison is with "friends" faceprints or "famous" faceprints.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for identifying iconic images or famous faces in digital images are provided. Specifically, rather than merely finding other photos that have "Grandma Jane" in them after the user has manually identified a photo with Grandma Jane, digital image management software that employs the techniques described herein may, for example, identify those photos, within a user's collection, that have famous movie stars in the form of a typical or iconic image. Further, the famous movie stars may be identified in the photos automatically without the user having to manually identify the movie star in any photo. Movie stars may even be identified automatically even in situations where the user does not know or would not recognize the movie star himself.

In one embodiment, digital image management software accomplishes the automatic recognition of famous or noteworthy faces by using a database of "iconic faceprints." A "faceprint" is data that indicates different features of a person's face. These "iconic" faceprints are not of faces identified in digital pictures taken by the end-user of the digital image management software. Instead, iconic faceprints are faceprints of a famous person's face, such as Tom Hanks, or of an iconic image, such as the Mona Lisa, Michelangelo's David, or Santa Claus, that are generated separately from and remotely relative to the digital image management software used by an end-user. In one embodiment, iconic faceprints are "shipped" with the digital image management software, unlike the facial recognition data that is created based on user photos that are accessible to the management software.

Example Media Management System

FIG. 1 is a block diagram that depicts an example digital media management system, according to an embodiment of the invention. Computing device 100 includes a digital image management application 110 and two databases: a locally-generated faceprint database 120 and a remotely-generated faceprint database 130. Non-limiting examples of a computing device 100 include a desktop computer, a laptop computer, a tablet computer, and a smart phone.

Embodiments of the invention are not limited to where digital image management application 110 resides or executes. Digital image management application 110 may be client-based software, i.e., that executes on a user's computing device (e.g., desktop or laptop computer). In this example, computing device 100 includes, or is directly connected to, a (e.g., LCD) display that displays digital images to a user of application 110. Alternatively, digital image management application 110 may be cloud-based software, i.e., that executes in a "cloud" that is separate from, but accessible by, a user's computing device (e.g., tablet or smart phone) via the Internet. In this example, computing device 100 is part of the cloud and databases 120 and 130 may be part of the same or different storage devices in the cloud. In a hybrid scenario, digital image management application 110 executes on an end-user's computing device and remotely-generated faceprint database 130 is maintained on a storage device that is remote relative to the user's computing device, such as in a cloud maintained by another party.

In addition to digital images, digital image management application 110 may also manage other types of data, such as digital video and digital audio. Furthermore, the file format of the digital images managed by digital image management application 110 may vary widely. Non-limiting examples of image file formats include JPEG, TIFF, GIF, BMP, PNG, RAW, and PSD (Adobe PhotoShop Document).

According to one embodiment, each of databases 120 and 130 includes object descriptors. An object descriptor is data that indicates multiple features of an object, such as a face. Because object descriptors are very often used to compare two faces, object descriptors are also known as "faceprints" and will be referred to hereinafter as "faceprints." For a different class of objects (i.e., other than faces), a different type of object descriptor would be used. The different type of object descriptor would include data about different types of features than the types of features used to describe a face. Although a faceprint is generated based on an image of an object (e.g., face) detected in a digital image, the process is irreversible and the image of the object cannot be generated only from the faceprint.

Multiple techniques for generating faceprints may be used. Embodiments of the invention are not limited to any particular technique. Non-limiting examples of face recognition techniques include Principle Component Analysis (PCA), Independent Component Analysis (ICA), Linear Discriminant Analysis (LDA), and Elastic Bunch Graph Matching (EBGM). The faceprints that are stored in locally-generated faceprint database 120 may be generated using a technique that is different than the technique that was used to generate faceprints stored in remotely-generated faceprint database 130. Furthermore, the format of faceprints that are stored in locally-generated faceprint database 120 may be different than the format of the faceprints that are stored in remotely-generated faceprint database 130. In such a scenario, in order to compare two faceprints of different formats, then one or both of the faceprints may first need to be transformed.

Locally-Generated Faceprint Database

Faceprints stored in locally-generated faceprint database 120 are generated from digital images managed by digital image management application 110. Once the faceprints are generated from digital images managed by digital image management application 110, those digital images may be deleted (although this is rarely the case). Thus, when faceprints in locally-generated faceprint database 120 are used, the digital images from which those faceprints were generated do not need to be accessible to digital image management application 110. Faceprints stored in locally-generated faceprint database 120 may be generated by digital image management application 110 or another software component associated with digital image management application 110. In likely scenarios, the faceprints stored in locally-generated faceprint database 120 are generated based on digital images generated by one or more digital cameras operated by the user of digital image management application 110.

Remotely-Generated Faceprint Database

Faceprints stored in remotely-generated faceprint database 130 are generated by a descriptor generating program 90 that executes separate from and remotely relative to digital image management application 110. In other words, descriptor generating program 90 is the source of the faceprints stored in remotely-generated faceprint database 130. Embodiments of the invention are not limited to where descriptor generating program 90 runs or executes. For example, descriptor generating program 90 may execute as client-based software or as a cloud service that generates faceprints in response to digital images supplied thereto.

Descriptor generating program 90 may be a different instance (or "copy") of digital image management application 110. Alternatively, descriptor generating program 90 may be a completely different program that generates faceprints in the same format as the faceprints generated by digital image management application 110.

Thus, faceprints stored in remotely-generated faceprint database 130 are produced independent of the digital images that are managed by digital image management application 110. Therefore, the faceprints in remotely-generated faceprint database 130 are "pre-defined" and may be "shipped" with a software product that includes digital image management application 110. Thus, faceprints stored in remotely-generated faceprint database 130 may be generated prior to digital image management application 110 even being executed on computing device 100.

In an embodiment, at least one faceprint stored in remotely-generated faceprint database 130 is generated from a digital image that is not managed by digital image management application 110. In a related embodiment, all faceprints stored in remotely-generated faceprint database 130 are generated from digital images that are not managed (or even accessible) by digital image management application 110.

Faceprints stored in remotely-generated faceprint database 130 are generated and selected by a party other then the user that is using digital image management application 110 to manage photos. For example, the developer of digital image management application 110 may create, select, and distribute the faceprints found in remotely-generated faceprint database 130. For example, in a client-based implementation of digital image management application 110, digital image management application 110 and remotely-generated faceprint database 130 may be installed on a computing device (e.g., computing device 100) prior to the device's purchase by an end-user. As another example, digital media management software may be purchased and retrieved over the Internet and installed on a computing device (e.g., computing device 100). The software includes remotely-generated faceprint database 130 and code used to install digital image management application 110.

As another example, a user's client device may initially include a digital image management application without remotely-generated faceprint database 130. A software update and remotely-generated faceprint database 130 may be subsequently provided to the user's client device. The software update, when processed by the user's client device, causes the digital image management application to be configured to access remotely-generated faceprint database 130 and perform any steps performed by digital image management application 110, as described herein.

In an embodiment, locally-generated faceprint database 120 is optional. In an embodiment that does not have locally-generated faceprint database 120, digital image management application 110 only identifies (in digital images that application 110 analyzes) famous people or objects identified in remotely-generated faceprint database 130.

Iconic Objects with Multiple Faceprints

In an embodiment, one or more objects identified in remotely-generated faceprint database 130 may be associated with multiple faceprints. For example, multiple faceprints of Paul McCartney may be stored in remotely-generated faceprint database 130. In an embodiment, such faceprints are selected based on how Paul McCartney has changed (e.g., aged) over time. For example, remotely-generated faceprint database 130 may include a faceprint for each decade of his life beginning with, e.g., the 1960's decade. Thus, remotely-generated faceprint database 130 may include at least 5 faceprints, each of which is associated with Paul McCartney.

In a related embodiment, a faceprint is generated for multiples views of an object, such as a person's face. For example, in addition to a direct view of Paul McCartney, one or more faceprints may be generated for profile views (e.g., left and right views) of Paul McCartney's face. Thus, remotely-generated faceprint database 130 might include, for each decade or other time period, multiple faceprints for multiple left profile views of Paul McCartney's face.

For other iconic or noteworthy objects, a single faceprint of each of such objects may be sufficient. For example, a single faceprint of the Mona Lisa and a single faceprint of Michelangelo's David may be stored in remotely-generated faceprint database 130 because such objects do not change. On the other hand, because people's faces change over time, multiple faceprints generated from multiple digital images of each famous person may be stored.

In a related embodiment, multiple faceprints of an object may be grouped into separate groups. For example, remotely-generated faceprint database 130 may include six faceprints of Paul McCartney's face in the 1960's, four faceprints of Paul McCartney's face in the 1970's, and five faceprints of Paul McCartney's face in the 1980's. When digital image management application 110 analyzes a digital image, detects a face therein, and generates a faceprint based on that face, digital image management application 110 may compare that faceprint with each faceprint of each Paul McCartney "decade" group.

Remotely-Generated Faceprint Database Structure

FIG. 2 is a block diagram that depicts a logical structure of remotely-generated faceprint database 130, according to an embodiment of the invention. Embodiments of the invention are not limited to any particular manner in which the data in remotely-generated faceprint database 130 is organized or stored. Non-limiting examples of storage models include a relational database, an object-oriented database, a graph database, and a multi-dimensional database.

As depicted in FIG. 2, remotely-generated faceprint database 130 is a relational database that includes one or more tables. The depicted table includes three columns: an identification data column 210 that identifies the famous person or object; a faceprint column 220 that stores a faceprint for the corresponding identity; and a metadata column 230 that stores information about the famous person or object and/or about the digital image from which the faceprint was generated. In the depicted table, multiple rows are associated with Ringo Starr and multiple rows are associated with Santa Claus. In an alternative embodiment, instead of multiple rows, the faceprint column may be configured to store one or more faceprints and/or a reference to another table or database object that stores one or more faceprints for the corresponding identity.

The identification data stored in column 210 may be, for example, a name of the person or object, such as "Paul McCartney," "Madonna," or "Mona Lisa."

Regarding metadata column 230, if the famous identity is a person, then information contained in metadata column 230 may include birthplace, date of birth, date of death (if applicable), and current residence. If the famous identity is a work of art or an iconic image, then information contained in metadata column 230 may include a creation date and where a version of the work of art or iconic image is on display.

Metadata column 230 (or another column not depicted in FIG. 2) may include one or more URLs that link to online resources, such as webpages (e.g., at IMDB, Wikipedia, LinkedIn, Facebook, YouTube) or media files, such as music files or video files. For example, metadata column 230 may store, for Paul McCartney Uniform Resource Locators (URLs) to (1) a Wikipedia webpage about Paul McCartney's life, (2) a Facebook page for "fans" of Paul McCartney, (3) a YouTube video of one of Paul McCartney's musical performances, and (4) iTunes™ where music by Paul McCartney may be purchased.

Match Process

Figure 3:
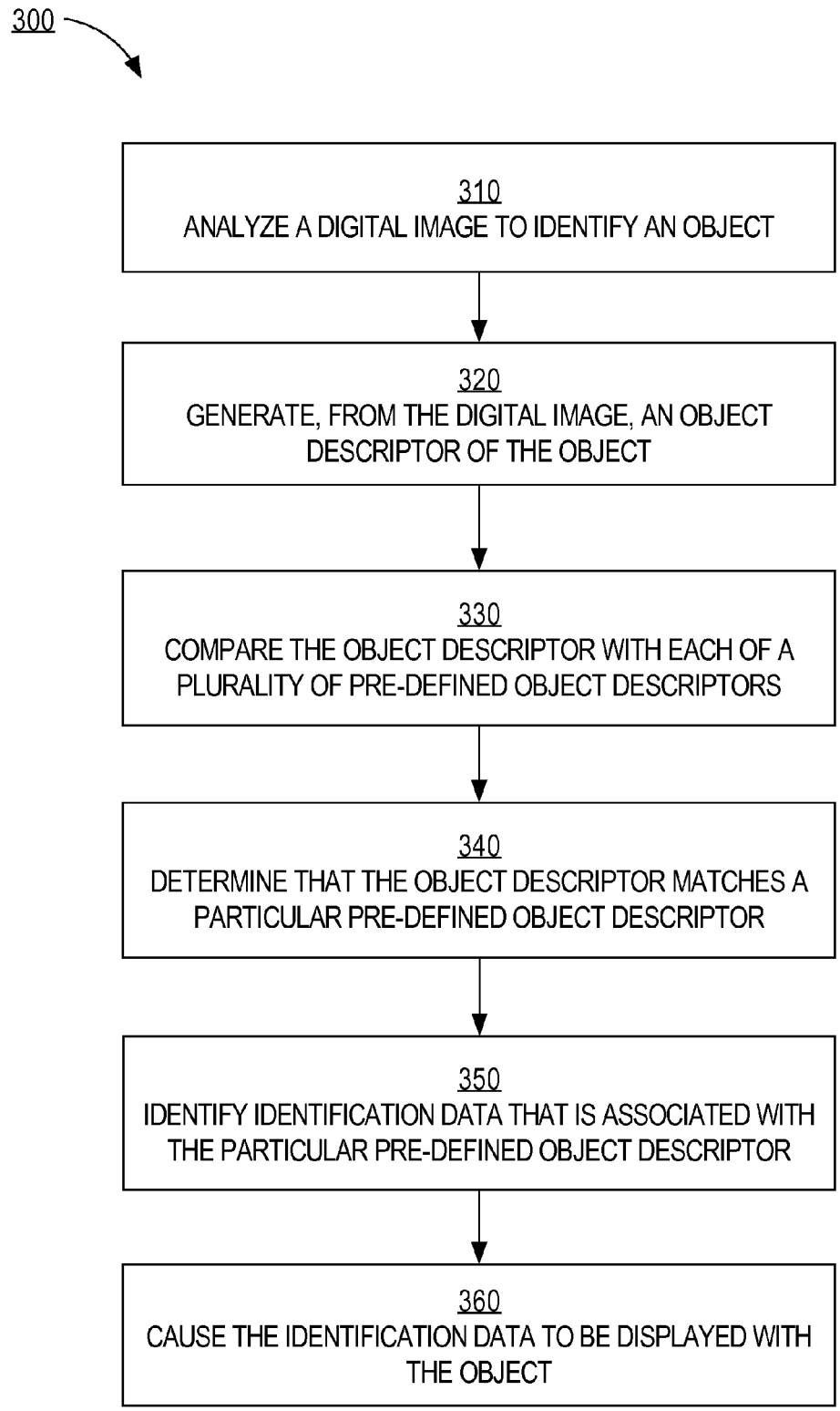
FIG. 3 is a flow diagram that depicts a process for using the remotely-generated faceprint database, according to an embodiment of the invention.

FIG. 3 is a flow diagram that depicts an example match process 300 for using remotely-generated faceprint database 130, according to an embodiment of the invention. Each step in process 300 may be performed by digital image management application 110 and/or another process associated with digital image management application 110.

At step 310, a digital image is analyzed to identify an object in the digital image. In the face scenario, this is known as "face detection." Thus, digital image management application 110 detects an object (such as a face) and ignores all other objects (such as buildings, trees, etc.) in the digital image. The digital image may be generated by a digital camera operated by a user of digital image management application 110.

At step 320, based on the digital image, a faceprint of the identified object is generated.

At step 330, the faceprint is compared with faceprints in remotely-generated faceprint database 130. In the face scenario, this is known as "face recognition." Comparing two faceprints may result in a confidence score. The confidence score indicates how similar (or how different) two objects are to each other. The confidence score may be between, for example, 100 (indicating a perfect match) and 0 (indicating the lowest possible score). The concept of a confidence score may also be understood as the "distance" (or difference) between two objects (or rather, between two faceprints). Thus, the lower the distance between two faceprints, the more similar the two objects are. Conversely, the higher the distance between two faceprints, the more dissimilar the two objects are.

As noted above, some famous people or objects may be associated with multiple groups, at least one of which includes multiple faceprints. For example, Paul McCartney is associated with a 1960's group of five faceprints, a 1970's group of four faceprints, and a 1980's group of seven faceprints. In an embodiment, the faceprint (generated in step 320) is compared to each faceprint in a group and the resulting set of confidence scores are combined to generate an aggregate confidence score. The aggregate confidence score may be an average of some or all of the confidence scores in the resulting set or another combination of some or all of the confidence scores in the resulting set. Alternatively, the "aggregate" confidence score may be the median confidence score in the resulting set. If the aggregate confidence score is greater than a threshold value (e.g., 90), then it is determined that a match is found. Otherwise, it is determined that a match is not found, at least with respect to that group. Confidence scores with respect to faceprints in other groups associated with the same identity (famous person or object) may be generated. Thus, even though a match may not be found with respect to Paul McCartney of the 1960's, a match may be found with respect to Paul McCartney of the 1980's.

At step 340, it is determined that the faceprint (generated in step 320) matches a faceprint in remotely-generated faceprint database 130. Two faceprints that "match" does not necessarily require a "perfect match," such as a confidence score of 100, the highest possible value on an example confidence scale. Rather, a confidence score greater than, for example, 85 may be considered a match. The confidence score at which two faceprints are considered to match is referred to as a "match threshold." It is assumed in process 300 that a match is found in remotely-generated faceprint database 130. However, if a match is not found in remotely-generated faceprint database 130, then process 300 ends at step 330.

At step 350, in response to determining that the faceprint matches a particular faceprint in remotely-generated faceprint database 130, identification data of the object that corresponds to the particular faceprint is identified. As noted above, the identification data may simply be a name of the person (if the faceprint is of a famous face), such as "Paul McCartney", or name of the object, such as "Mona Lisa."

At step 360, the identification data is displayed, for example, on the digital image. The identification data may be displayed above, below, or to one side of the object (e.g., face). The identification data may be displayed, for example, as soon as the identification data is identified. As another example, the identification data may be displayed only for a certain amount of time, after which the identification data ceases to be displayed. As yet another example, the identification may be displayed only when the user places a cursor over or near the object.

User Feedback

In an embodiment, a user (after step 360) is allowed to confirm whether or not the "recognized" object is indeed the object indicated by the identification data. For example, digital image management application 110, in displaying the identification data, may display a "confirm" UI element (which may include, for example, a green check graphic) and a "reject" UI element (which may include, for example, a red "X" graphic). If the "confirm" UI element is selected, then the digital image management application 110 determines that the identification of the match in step 340 was correct. If the "reject" UI element is selected, then the digital image management application 110 determines that the identification of the match in step 340 was incorrect.

If application 110 receives a threshold number of rejections, a threshold number of rejections over a certain period of time, or a certain ratio of rejections to confirmations (e.g., 1:2), then the match threshold for determining if the faceprint generated in step 320 matches a faceprint in remotely-generated faceprint database 130 may be increased (e.g., from 90 to 95). An increase of the match threshold indicates that two faceprints must now be more similar in order for a match to occur. Similarly, if application 110 receives a threshold number of confirmations, a threshold number of confirmations over a certain period of time, or a certain ratio of confirmations to rejections (e.g., 5:1), then the match threshold for determining if the faceprint generated in step 320 matches a faceprint in remotely-generated faceprint database 130 is decreased (e.g., from 90 to 87). A decrease of the match threshold indicates that two faceprints do not have to be as similar in order for a match to occur.

In a related embodiment, different objects identified in remotely-generated faceprint database 130 may be associated with different match thresholds. For example, initially, the match threshold for all objects identified in remotely-generated faceprint database 130 may be the same (e.g., 90). Subsequent confirmations or rejections only affect the object identified by the identification data displayed to the user. Thus, if Ringo Starr is correctly identified ten times in a row, then the match threshold associated with Ringo Starr might decrease (e.g., from 90 to 85) while the match threshold associated with other identities (e.g., Paul McCartney) in remotely-generated faceprint database 130 remains unchanged (e.g., at 90). It may have been the case that digital image management application 110 made a number of false negatives, i.e., where digital image management application 110 determined that a detected object is not Ringo Starr (e.g., confidence score of 88, which is less than match threshold 90) even though the detected object is Ringo Starr.

Similarly, if digital image management application 110 incorrectly identifies a person in one or more digital images as George Harrison, then the match threshold associated with George Harrison might increase (e.g., from 90 to 95) while the match threshold associated with other identities in remotely-generated faceprint database 130 remains unchanged (e.g., at 90). One reason for a number of incorrect matches is that a famous individual may have a face that is similar to a friend or family member identified in locally-generated faceprint database 120. Thus, to reduce the likelihood that that famous individual is incorrectly identified by digital image management application 110 in the future, the match threshold associated with only that famous individual is increased.

Searching Locally-Generated Faceprint Database

In an embodiment not depicted in FIG. 3, step 330 is preceded by a step to compare (a) the faceprint generated in step 320 with (b) faceprints stored in locally-generated faceprint database 120. If a match is found, then identification data of the object that corresponds to the matched faceprint in locally-generated faceprint database 120 is identified and displayed. No comparing of the faceprint generated in step 320 with faceprints in remotely-generated faceprint database 130 is then necessary. Thus, steps 330-360 may be avoided. However, if a match in locally-generated faceprint database 120 is not found, then process 300 proceeds to step 330.

In an embodiment, the match threshold used to determine if the faceprint generated in step 320 matches a faceprint in locally-generated faceprint database 120 is different than the match threshold used to determine if the faceprint generated in step 320 matches a faceprint in remotely-generated faceprint database 130. For example, the match threshold used for locally-generated faceprint database 120 may be 80 while the match threshold used for remotely-generated faceprint database 130 may be 90 (indicating that a higher confidence score is necessary for a match). Such a difference in match thresholds indicates that digital image management application 110 needs to be more "confident" about matches with famous people or objects than about matches with friends. One reason for a higher match threshold (i.e., closer match) for remotely-generated faceprint database 130 is because too many incorrect "matches" with respect to the remotely-generated faceprint database 130 may result in poor user experience. Generating false positives with respect to friends is considered to be not as bad as generating false positives with respect to famous people or things. Famous people and iconic images are less likely to appear in images taken (or imported) by a user of application 110 than friends of the user.

In an embodiment, digital image management application 110 allows a user to view other images that are determined to include a particular person identified in another image (e.g., currently being displayed). For example, a user confirms that his friend Bob Smith is in a digital image. In response to that confirmation, digital image management application 110 causes, to be displayed, digital images (or portions thereof) that application 110 determines include Bob Smith. This determination includes comparing a faceprint of Bob Smith with previously-generated faceprints. Because the faceprints of the user's friends are stored separate from faceprints of famous people (i.e., locally-generated faceprint database 120 v. remotely-generated faceprint database 130), a significant amount of processing can be reduced.

Furthermore, any digital images of famous people are prevented from being displayed as possible digital images of Bob Smith. This may be accomplished by physically or logically separating digital images with known famous people from other digital images. For example, one portion of storage is designated as storing only digital images with known famous people. Because the number of such digital images may change over time, the designated portion of storage may increase or decrease accordingly. Additionally or alternatively, each digital image with a known famous person is associated with metadata that indicates that the corresponding digital image contains a famous individual. Because Bob Smith is not a famous individual and digital images of known famous people can be ignored using their associated metadata, digital images (or portions thereof) of famous people will not be displayed as possible digital images of Bob Smith.

Additional Faceprint Metadata

In an embodiment, metadata of faceprints can be used to increase the accuracy of the confidence score. Non-limiting examples of such metadata include whether the image is in black and white, the position of the identified object relative to other objects in the corresponding digital image, and the color and/or texture of the identified object. For example, while famous people have a certain skin tone, Michelangelo's David (and other famous works of art) do not. Instead, Michelangelo's David is gray and made of a type of marble that has a certain texture. With this extra knowledge (i.e., in addition to the faceprint), a confidence score generated by a comparison between two faceprints can be increased or decreased.

As another example, some iconic images are in black and white. Thus, if a digital image that is analyzed by digital image management application 110 is in black and white and a face is detected, then knowledge that the digital image is in black and white may be used, in addition to the generated faceprint, to determine a final confidence score with respect to a faceprint in remotely-generated faceprint database 130. If metadata of the faceprint indicates that the iconic image from which the faceprint was generated is in black and white, then the confidence score may be increased. Conversely, if the analyzed digital image is not in black and white and metadata of the faceprint indicates that the iconic image from which the faceprint was generated is in black and white, then the confidence score may be decreased.

As noted above, metadata of a faceprint may indicate the position of the corresponding person (or object) in the digital image from which the faceprint was generated. The position may be absolute (e.g., top right quadrant of the corresponding digital image). Additionally or alternatively, the position may be relative to one or more other objects (e.g., famous people) in the corresponding digital image. For example, a digital image includes a picture of, from left to right, members of the Beatles: George Harrison, Paul McCartney, John Lennon, and Ringo Starr. However, glare from the sun causes John Lennon to be unrecognizable to digital image management application 110. Digital image management application 110 generates position data that indicates the position of the three known (or recognized) band members in the digital image relative to the unknown person. The position data may simply indicate a left-to-right ordering (i.e., in a single dimension) or may be more sophisticated, such as indicating the positions in a two-dimensional space. Metadata associated with a faceprint (generated from a similar picture) for Paul McCartney may indicate that George Harrison is to the left of Paul and John Lennon and Ringo Starr are to the right of Paul. Digital image management application 110 uses the position data from the analyzed digital image and position data from the metadata of the stored faceprint to determine that the unknown person in the analyzed digital image is John Lennon.

Building the Remotely-Generated Faceprint Database

Embodiments of the invention are not limited to how remotely-generated faceprint database 130 is generated. The faceprints stored in remotely-generated faceprint database 130 may be selected in a number of ways. For example, faceprints of famous people and/or iconic images may be selected in an entirely manual way or according to a manual/ automatic hybrid approach. For example, the initial set of digital images of famous people or iconic objects may be established by one or more people. A process analyzes each digital image in the set and detects faces and generates faceprints for each detected face. A user manually identifies each detected face or object. Additionally or alternatively, the user identifies the famous person or object prior to the process detecting the object. Thus, a process stores data that associates the manual identification with the digital image.

In an embodiment, remotely-generated faceprint database 130 is generated automatically from a large corpus of images (e.g. from public image databases like IMDB or Flickr) by detecting groups of faceprints that are internally pair-wise near perfect matches (e.g., score above 98).

In one approach, each generated faceprint from the initial set of digital images is stored in remotely-generated faceprint database 130. However, this approach might cause remotely-generated faceprint database 130 to grow too large, resulting in requiring a significant amount of storage space and a significant amount of time to find a match (due to the large number of faceprints) in remotely-generated faceprint database 130.

In another approach, one or more faceprints of one or more famous people or iconic images are filtered out and not included in remotely-generated faceprint database 130. Such filtering may involve comparing one faceprint of one object (or identity) with another faceprint of the same object. If the confidence score is a perfect or near perfect match (e.g., between 98-100), then one of the faceprints may be filtered out. In other words, if the distance between two faceprints is zero or near zero, then one of the faceprints is not included in remotely-generated faceprint database 130. For example, two faceprints of Ringo Starr have a confidence score relative to each other of 99 on a scale from 1 to 100 (indicating a near perfect match). If a particular faceprint of Ringo Starr generated by digital image management application 110 matches very closely with one of the two faceprints of Ringo Starr in remotely-generated faceprint database 130, then that particular faceprint would also match very closely with the other of the two faceprints of Ringo Starr. Thus, performing the second comparison may not be necessary. Storing both faceprints in remotely-generated faceprint database 130 would be similar to storing two copies of the same faceprint in remotely-generated faceprint database 130. Accordingly, one of these two faceprints of Ringo Starr is not included in remotely-generated faceprint database 130.

In an embodiment, determining which faceprints to include in remotely-generated faceprint database 130 involves (a) creating multiple groups and (b) assigning each faceprint of multiple faceprints of the same object (or identity) to a different group of the multiple groups. Thus, in addition to being associated with a particular famous person or object, each faceprint may also be associated with a group of that particular famous person or object. The creation of groups and the assigning of a faceprint to a group may be performed completely automatically or at least partially manually. For example, given the example above, multiple groups can be created for Paul McCartney based on user input: one group for each decade beginning with the decade of the 1960's. Then, user input might assign, to the appropriate group, faceprints generated from digital images with Paul McCartney. Alternatively, if a digital image is associated with electronic data that indicates a date, then a process might automatically assign, to the appropriate group, faceprints generated from digital images with Paul McCartney.

As another example, groups are automatically created based the differences between the faceprints of a particular famous person or object. Each faceprint of an identity is compared to each other faceprint of the identity to generate a confidence score (or distance measure) for each comparison. Faceprints that have high confidence scores with each other (e.g., over 98) are assigned to a single group. Any other faceprints that have a lower confidence score (referred to as low confidence faceprints) with one or more faceprints in that group will not be assigned to that group. Instead, one or more other groups will be created and the low confidence faceprints will be assigned to one of the one or more other groups.

For example, 100 faceprints for Ringo Starr are generated based on 100 digital images of Ringo Starr. 10 of the 100 faceprints are determined to have a confidence score of 95 or higher with each other. A group (e.g., G1) is automatically created for Ringo Starr. Those 10 faceprints are automatically assigned to that group. Of the remaining 90 faceprints, 12 faceprints are determined to have a confidence score of 95 or higher with each other. Thus, a second group (e.g., G2) is automatically created for Ringo Starr and those 12 faceprints are automatically assigned to that group. After a group is created, faceprints assigned to that group may be analyzed to determine whether one or more faceprints may be filtered (or removed) from the group, as described above.

Alternative to Remotely-Generated Faceprint Database

An alternative approach to the approaches described above is to store digital images of famous people or objects, instead of only storing faceprints of the famous people/objects. In this way, digital image management application 110 might have to generate a faceprint for each iconic image. A disadvantage to this alternative approach is that copyright law may prevent the including of many, if not most, of the iconic images. In order to include those "protected" images, permission must be obtained from the owners of those images in order to include the images with the digital image management software product. Obtaining such permissions might be very expensive in terms of the cost to purchase those rights and the cost to employ the human labor required to complete those purchases, which may number in the hundreds or thousands.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
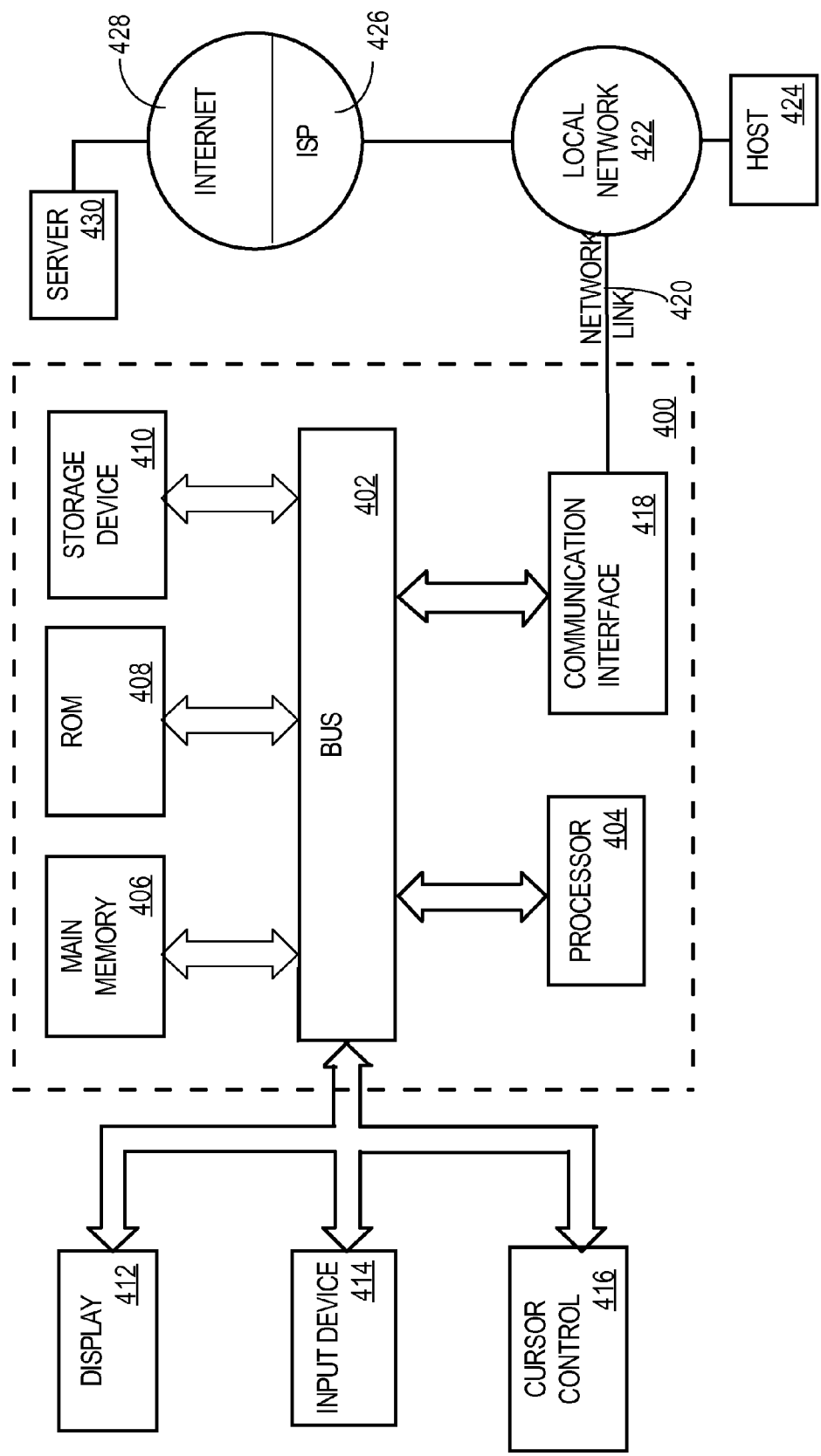
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
analyzing, by a digital image management application, a digital image to identify an object;
in response to identifying the object, generating a particular object descriptor that indicates one or more features of the object;
comparing the particular object descriptor with each of a plurality of pre-defined object descriptors, wherein each of the plurality of pre-defined object descriptors was generated by a descriptor generating program that executed separately from and remotely relative to the digital image management application, a first match threshold is used to determine if the particular object descriptor matches object descriptors of the plurality pre-defined of object descriptors;
comparing the particular object descriptor against each of a plurality of locally generated object descriptors, wherein each of the plurality of locally generated object descriptors was generated by the digital image management application, a second match threshold is used to determine if the particular object descriptor matches object descriptors in the plurality of locally generated object descriptors;
in response to determining that the particular object descriptor matches a first object descriptor of the plurality of pre-defined object descriptors or the plurality of locally generated object descriptors, identifying an object identifier that is stored in association with the first object descriptor; and
causing the object identifier to be displayed;
wherein the method is performed by one or more computing devices, and the first match threshold is different than the second match threshold.

2. The method of claim 1, wherein at least one object descriptor of the plurality of pre-defined object descriptors was generated from a digital image that is not managed by the digital image management application.

3. One or more storage media storing instructions which, when executed by one or more processors, cause performance of the method of claim 2.

4. The method of claim 1, wherein each object descriptor of the plurality of pre-defined object descriptors was generated from digital images that are not managed by the digital image management application.

5. One or more storage media storing instructions which, when executed by one or more processors, cause performance of the method of claim 4.

6. The method of claim 1, wherein:
the plurality of pre-defined object descriptors correspond to a plurality of identities; and
each object descriptor of the plurality of pre-defined object descriptors is associated with only a single identity of the plurality of identities.

7. The method of claim 6, wherein:
an identity of the plurality of identities is associated with multiple groups of a plurality of groups; and
a particular group of the plurality of groups is associated with multiple object descriptors of the identity.

8. The method of claim 7, wherein:
comparing the particular object descriptor with each of a plurality of pre-defined object descriptors comprises:
comparing the particular object descriptor with each object descriptor in the particular group to generate a plurality of confidence scores, and
combining each confidence score of the plurality of confidence scores to generate an aggregate confidence score; and
identifying the object identifier is based on the aggregate confidence score.

9. One or more storage media storing instructions which, when executed by one or more processors, cause performance of the method of claim 8.

10. One or more storage media storing instructions which, when executed by one or more processors, cause performance of the method of claim 7.

11. One or more storage media storing instructions which, when executed by one or more processors, cause performance of the method of claim 6.

12. The method of claim 1, further comprising, after causing the object identifier to be displayed, receiving input that indicates whether the object identifier accurately identifies the object.

13. The method of claim 12, further comprising, based on the input and one or more other inputs regarding whether the object identifier identifies one or more objects in one or more other digital images, modifying a match threshold associated with the object identifier and one or more object descriptors associated with the object identifier, wherein the match threshold is used to determine whether one object descriptor matches an object descriptor associated with the object identifier.

14. One or more storage media storing instructions which, when executed by one or more processors, cause performance of the method of claim 13.

15. One or more storage media storing instructions which, when executed by one or more processors, cause performance of the method of claim 12.

16. One or more storage media storing instructions which, when executed by one or more processors, cause performance of the method of claim 1.

17. The method of claim 1, further comprising:
increasing the first match threshold in response to a threshold number of confirmations over a certain period of time, or a specified ratio of confirmations to rejections; and
decreasing the first match threshold in response to a threshold number of rejections over the certain period of time.

18. A method comprising:
generating, by a first system, first object descriptors based on a first plurality of digital images;
wherein each object descriptor of the first object descriptors is generated from at least one of the first plurality of digital images;
storing identification data that associates each object descriptor of the first object descriptors with name data that specifies a name for an object that appears in the at least one digital image from with the object descriptor was generated;
providing the first object descriptors and the identification data for use in a second system that is configured to (a) generate second object descriptors based on a second plurality of digital images that are managed by the second system and (b) attempt to match the second descriptors with the first object descriptors without having access to the first plurality of digital images;
wherein the method is performed by one or more computing devices that are separate from the second system.

19. The method of claim 18, wherein:
providing the first object descriptors and the identification data for use in a second system comprises storing the first object descriptors and the identification data in a software product that includes code to install the second system; and
the software product does not include the plurality of digital images.

20. One or more storage media storing instructions which, when executed by one or more processors, cause performance of the method of claim 19.

21. The method of claim 18, wherein providing the first object descriptors and the identification data for use in a second system comprises causing the first object descriptors and the identification data to be stored in a cloud environment that is accessible by a plurality of client devices via the Internet.

22. One or more storage media storing instructions which, when executed by one or more processors, cause performance of the method of claim 21.

23. One or more storage media storing instructions which, when executed by one or more processors, cause performance of the method of claim 18.

* * * * *